Figure 1:
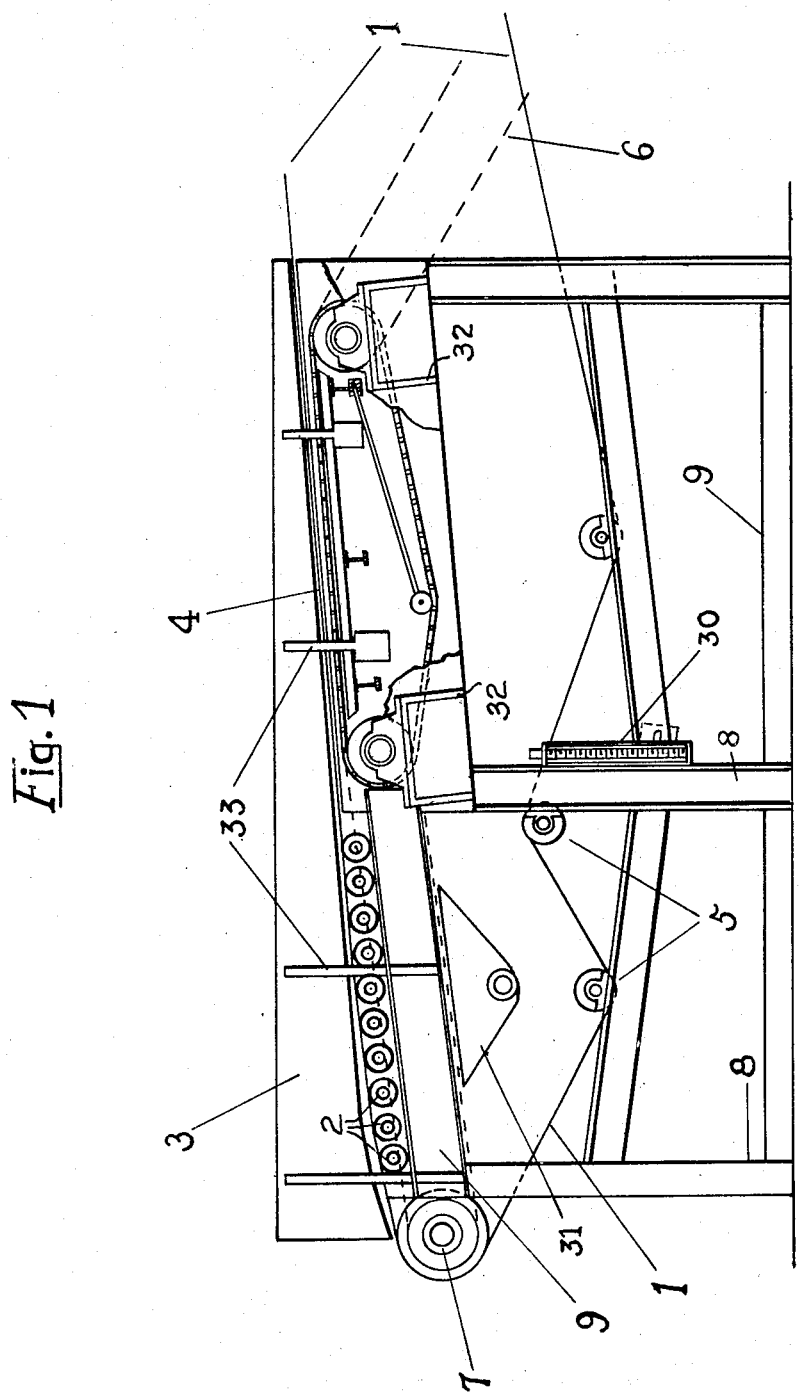
Figure 4:
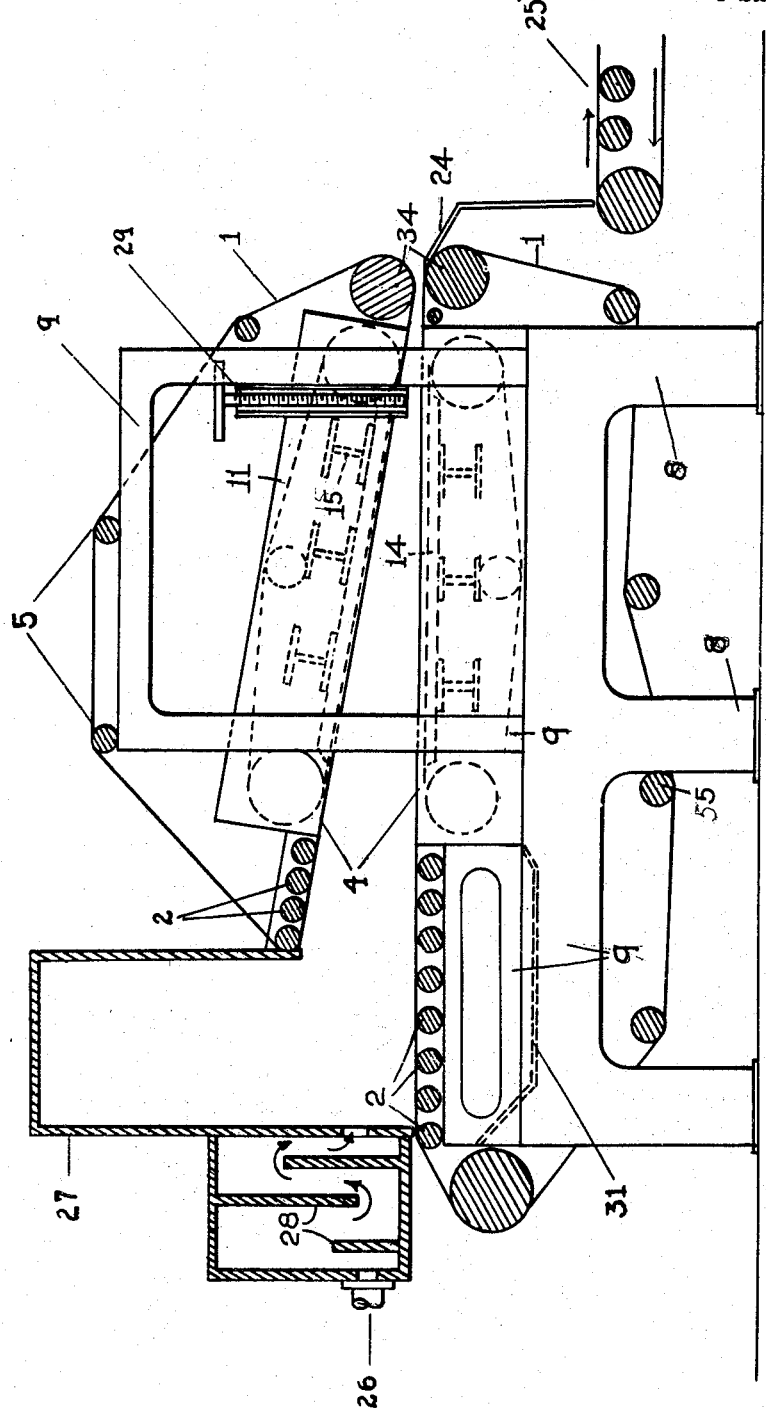

Feb. 11, 1936.　　　R. W. RICHARDSON　　　2,030,538
CONTINUOUS FILTER
Filed March 21, 1932　　　4 Sheets-Sheet 1

INVENTOR.
Roger W. Richardson
BY
ATTORNEY.

Feb. 11, 1936.       R. W. RICHARDSON       2,030,538
CONTINUOUS FILTER
Filed March 21, 1932       4 Sheets-Sheet 2
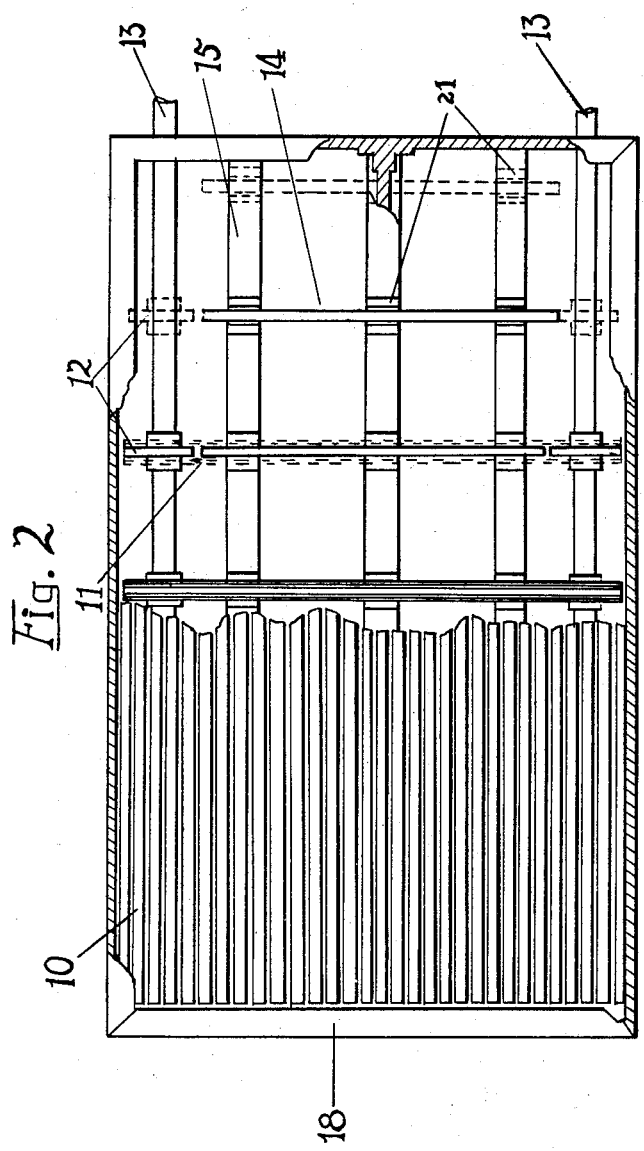
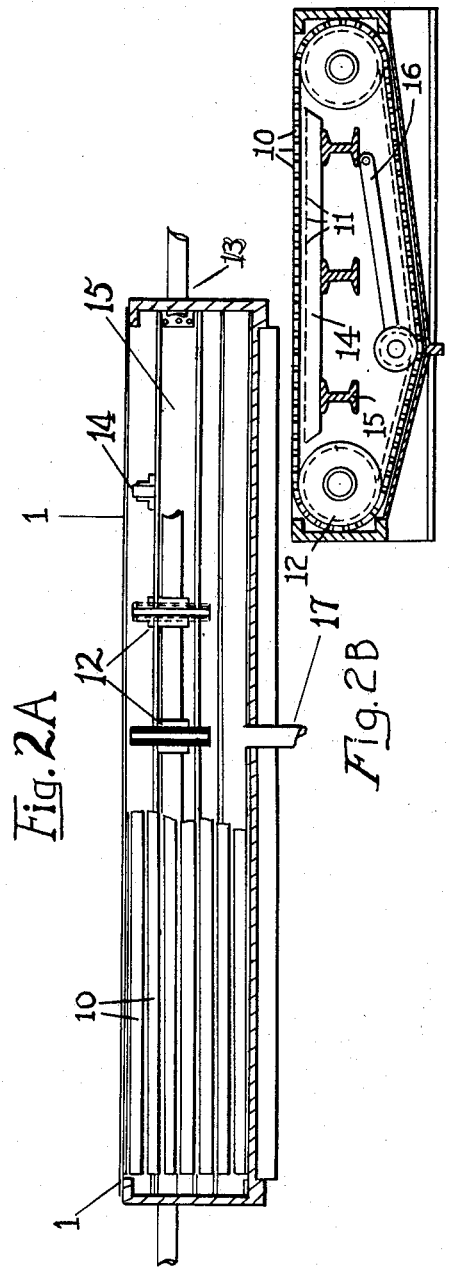
INVENTOR.
Roger W. Richardson
BY
Allan R Plumley
ATTORNEY.

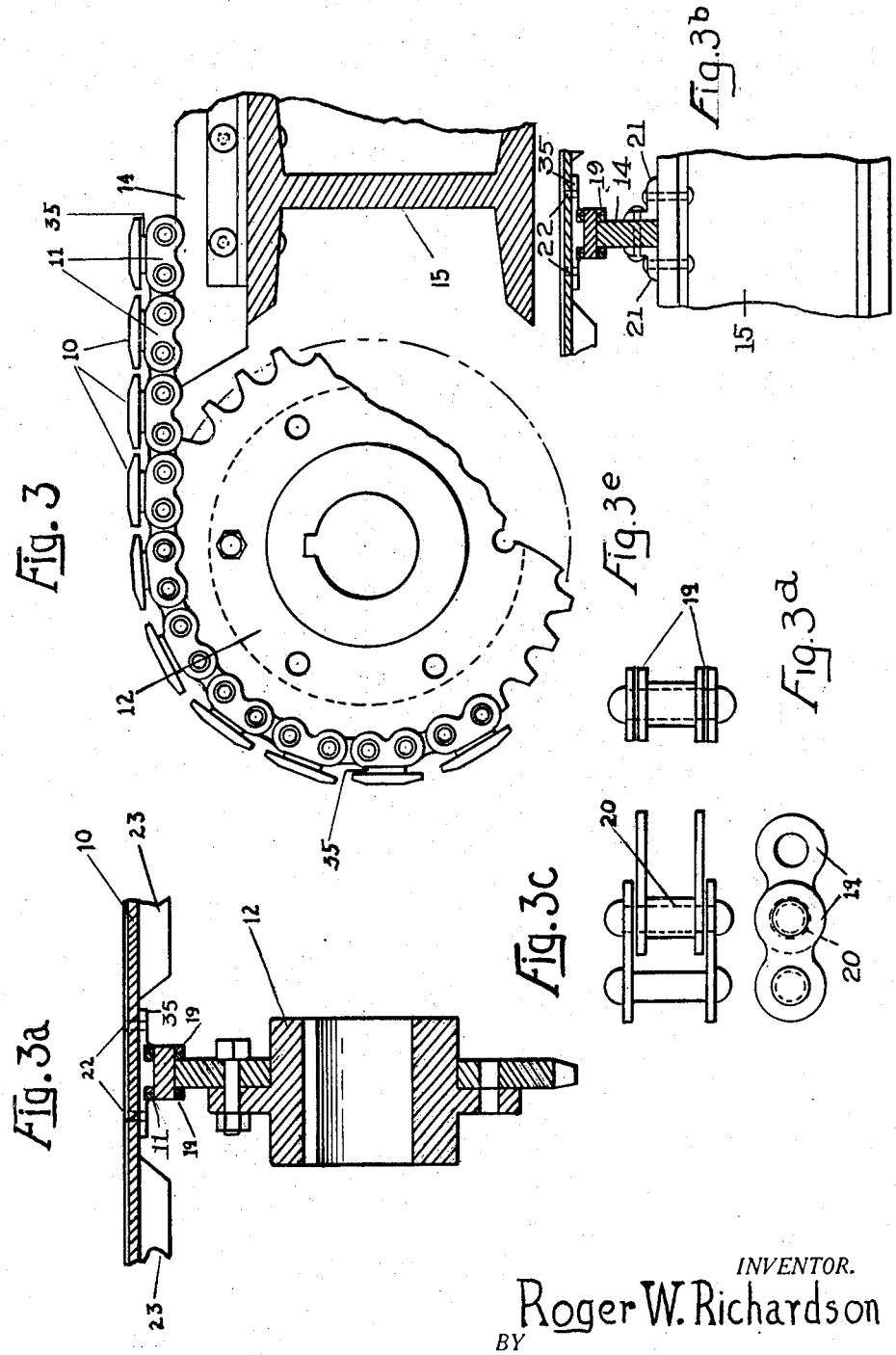

Feb. 11, 1936.  R. W. RICHARDSON  2,030,538
CONTINUOUS FILTER
Filed March 21, 1932  4 Sheets-Sheet 4

INVENTOR.
Roger W. Richardson
BY
Allan R Plumley
ATTORNEY.

Patented Feb. 11, 1936

2,030,538

UNITED STATES PATENT OFFICE 2,030,538

CONTINUOUS FILTER

Roger W. Richardson, Wilmington, Del.

Application March 21, 1932, Serial No. 600,141

7 Claims. (Cl. 92—52)

This invention relates to filters and more particularly to a continuous filtering or board forming machine for use in processes wherein a solid is separated from a liquid, suspension, or the like.

In the manufacture of building or insulating board it has previously been proposed to accomplish the separation of pulp and formation of a mat thereof from a pulp suspension by the use of a cylindrical filter, as, for example, by means of the Oliver filter.

In straightening out the board or wet mat of pulp from its resultant cylindrical form to that of the desired flat surface the mat is subjected throughout to considerable strain with a consequent weakening of the fibrous structure.

Another proposed process or apparatus for the removal of pulp from a pulp suspension involves the use of a Fourdrinier paper machine or the like by which the liquid is removed in part by draining through a screen but a greater part is removed by the use of suction boxes. In utilizing suction boxes there is considerable friction and wear on the traveling screen as well as upon the surface of the box. The replacement and renewal of screens, moving parts and the like which frequently results is expensive and necessitates frequent shut downs for repairs.

Another filtering process in which great difficulty is experienced is the separation of kraft or soda pulp from the liquor in which it is cooked. It is necessary in this process to segregate the pulp from the cook liquor very completely, because the cook liquor contains valuable chemical and it is desirable that the liquor be substantially undiluted because said liquor is subsequently evaporated. In recent years attempts have been made to separate the aforesaid pulp from aforesaid liquor on continuous filters, such as the Oliver filter or the like. Great difficulty is experienced in following such a procedure, however, because of the foamy character of the liquor and the chemical recovery is not as high as is desired nor is the filtrate obtained in an undiluted state.

In many other filtering operations it has been necessary to utilize a batch filter such as a filter press, rather than a continuous filter, because a satisfactory degree of separation of liquid and solid could not be obtained continuously.

It is an object of this invention to overcome these and other disadvantages of the prior art and to provide an improved filter or board forming machine.

It is a further object of my invention to provide a continuous filter which can operate under the combined forces of pressure and suction and thus provide a high pressure differential across the filter.

It is a still further object of my invention to provide a filter or board forming machine which will permit the manufacture of a pulp mat, insulating material, or the like, from a pulp which has heretofore been impossible or highly difficult to work, because of the tenaciousness with which the pulp clings to the water held therein.

It is an additional object of my invention to provide an apparatus which may be utilized in filtration processes generally wherein it is desired to continuously effect the separation of a solid from a liquid or from a suspension of said solid in a liquid.

It is also an object of this invention to provide a filter upon which a residue, filtrate, or the like may be washed a plurality of times with an easy and economical recovery of the wash liquor.

Other objects and advantages of my invention will be apparent by reference to the following specification in which the preferred details and embodiments thereof are described and by reference to the accompanying drawings which illustrate applications of my invention and in which:

Figure I is a representation of a board forming machine in which the features of my invention may be incorporated to great advantage;

Figures II, IIa, and IIb represent the plan, end elevation and side elevation respectively of the filter or suction box features of the invention;

Figures III and IIIa represent a side and end elevation respectively of a sprocket wheel and the roller chain and attached members, and Figure IIIb represents the end elevation of a rail or support on which the roller chain and continuous carrying mechanism of my invention run;

Figures IIIc, IIId and IIIe represent three detailed views of a link or section of roller chain;

Figure IV represents an application of my invention to pressure and/or suction separation or filtration wherein pressure is utilized from one side and suction from the other side of the suction box.

Referring to the drawings more in detail, Figure I represents an elevation of a known board forming machine in which the features of my invention may be advantageously embodied, and by reference thereto in the following description it will be apparent wherein the various elements of my invention enter and exert their desirable and advantageous effect. According to my invention a pulp suspension from a convenient source, or suspension from which it is desired to remove a liquid, is placed upon a screen wire or filter cloth 1 which moves over rolls 2 and within the deckle boards 3 supported by members 33. The wire 1 travels over a breast roll 7 toward and over the table rolls 2 and sufficient pulp suspension is introduced to form a pool of water and pulp toward the rear end of the machine, for example over the table rolls 2. As the wire travels forward a part of the water is drained from the pulp, passing downward between the rolls and is caught in the trap or save-all 31. However, there is still a considerable quantity of water in the pulp when it reaches the suction box 4 and here, according to my invention, suction is applied and considerably more liquid removed from the pulp mat. The pulp mat emerges from the forward end of the suction box in a condition in which the great part of the free liquid has been removed.

It is broadly with reference to that part of a board forming operation or filtration method taking part in suction box 4 in which the features of my invention enter and may be advantageously applied to greatly facilitate efficiency and economies of operation.

Several parts of the apparatus illustrated by the drawings such as the screen tightening rolls 5 and screw mechanism 36, the supports 8, framework 9, and driving mechanism 6 are shown to expedite the explanation of a mode of operation of my invention.

As hereinbefore explained, the screen wire 1 passes over the surface of the suction box 4, and, in the usual type of apparatus such as previously described, at this point considerable friction and wear upon the moving parts take place. According to my invention, however, such friction is obviated for the construction of the suction box is such that the wire 1 comes in contact with a moving surface composed of a series of slats 10, shown in Figures II, IIa, IIb, III, IIIa, IIIb, which are driven at the same speed as the moving wire 1. Thus, at no time is a wearing effect or friction exerted by or upon the moving screen.

The moving slats 10, which may be strengthened between the supporting members such as by reinforcements 23, are supported by and securely attached by bolts 22 to a series of roller chains 11 which in turn are driven by and revolve upon sprocket wheels 12. These slats are attached to members 35, as shown in Figures IIIa and IIIb, said members being an integral part of or attached securely to links 11. The sprockets or sprocket wheels 12 are mounted upon shafts 13 which are in turn supported at either end of the suction box 4 by the bearings 32.

Between the ends of the suction box at the points where the shafts 13 support the sprocket wheels 12 the continuous belt of slats 10 ordinarily would tend to sag but, according to my invention, support between these points is obtained by means of rails 14 which in turn are supported upon and attached by bolted members 21 to cross members 15. The construction of these rails 14 is such that the roller member or sleeve 20 (Fig. IIIc) of the roller chain link 11 rides upon them, held in fixed rolling relationship to the rails by the skirt or lip 19 of the individual links 11. The cross-supporting members 15 may be I-beams or of any other suitable construction which will support the load and which can be conveniently attached to the sides of the suction box. The whole moving slat mechanism or caterpillar arrangement is driven by and synchronized with the other moving parts by chain drives or other known mechanisms which can be attached to the end of the shafts 13.

The rider 16 is a device for keeping the continuous belt of slats 10 supported on roller chains 11 at a definite tension so that the operation of the whole apparatus will be smooth and even. Vacuum may be applied to the suction box by means not shown and liquid sucked into it may be removed by a pipe line attached at some convenient point, such as the opening 17 in Figure IIa. The edges of the screen wire 1 ride upon the side of the box 18 which is a part of the framework of the suction box. Since this screen is covered with a mat of pulp, it is possible to maintain a vacuum within the suction box. In Figure IIa the moving screen wire 1 is represented as passing over the surface of the suction box.

Figure III shows a detail of the sprocket wheel 12 and a section of the roller chain 11 to each link of which or to an extension thereof 35 is attached a slat 10. Figure IIIa shows an end view of the same combination wherein a detail is illustrated showing the attachment of the slat 10 by bolts 22 and members 35 to the link 11, the lips or skirts of which 19 are designated. It will therein be seen that the slat 10 is part, if desired, of a T-section with the web 23 cut out where the slat 10 is attached to the roller chain link 11. The roller chain used is of such a type that it is possible to bolt or otherwise attach thereto sections similar to the slats described.

It will be apparent from the above description of my invention that by properly arranging the rails 14 and their supports as well as by properly spacing the sprocket wheels along the length of the shafts 13 according to accepted principles of machine design, it is possible to produce a machine of great strength and durability which may withstand pressures of many pounds per square inch of surface, and thus to allow the removal of a liquid from a solid in a process wherein it may be desirable to utilize high pressures as subsequently described.

According to my invention it is possible to rapidly and economically repair or replace worn parts, inasmuch as the internal mechanism including the shafting, sprocket wheels, chain belts, movable slats and the like may be entirely removed or lifted from the box itself.

As an added advantage of my invention application may be made thereof to any filtration operation wherein it has heretofore been impossible to operate continuously because of the high pressures involved when applied simultaneously with suction. Thus, among numerous applications of my invention, it may be utilized in operations wherein either pressure alone, or suction alone, or combined pressure and suction are applied for filtration purposes. For example, in the separation of black liquor from kraft and soda pulp wherein it is desirable to effect a complete separation with the minimum of dilution of wash water, my invention is directly applicable.

In a process such as above outlined, it is possible, according to my invention, to separate liquor from pulp in the kraft or soda process by applying my invention as shown in Figure IV wherein a pulp suspension is introduced under pressure through the pipe 26 into the container or head box 27, and in so being introduced is agitated and mixed by passing between and around the baffles 28. Upon entering the container 27 the pulp suspension is directly over and between the two sets of table rolls 2 which are covered by and in direct contact with the moving wire screens 1 which are continuously moving toward the suction boxes 4. It will be apparent that the pulp suspension is between and in direct contact with the moving screen 1 and that as the screens move forward the space therebetween becomes progressively smaller. Thus the mass is continuously subjected to greater and greater pressure and becomes constantly of a smaller thickness resulting in a mass emerging between the front rolls 34 which is relatively free from the liquor originally contained therein.

The suction boxes 4 are of the same general construction as those shown in Figure II and essential parts thereof such as the roller chain 11, rails or tracks 14, and supporting members 15 are shown in dotted lines so that the application of said boxes to this process can be readily understood. The pulp mat is removed from the rolls 34 by any suitable means such as the scraper 24 and drops, if desired, upon the conveyor 25. Beyond this point it may be washed with fresh water if desired and the same type of filtering operation repeated or, since the greater quantity of the cook liquor has been removed and recovered, it may not be desirable to wash the pulp, or it can be washed on a somewhat simpler device such as a filter operating under suction alone of the general type hereinbefore described and shown in Figure I.

From the foregoing discussion of the machine or filter as shown in Figure IV it can be seen that this device will continuously operate under simultaneous pressure and suction, and thus effect very rapidly a highly complete separation of the solid material from the associated liquid. Thus, for example, a kraft or soda pulp, or the like, containing a quantity of liquid may be introduced between the table rolls 2, where it is subjected to an increasing pressure as it travels toward the suction boxes 4. As the material enters that part of the device comprising the suction boxes 4 it is constantly squeezed to a smaller mass with a resultant liquid removal. At the same time a suction is applied in the interior of the suction boxes which further facilitates and causes the very complete removal of the associated liquid. The suction boxes, and the upper and lower faces of the machine, are held at such an angle relative to one another that the gradually increasing pressure is such that the machine operates most efficiently and with best results on the type of filtrable material encountered. The operating angle which the faces of the machine bear to one another as well as the clearance therebetween at the exit may be set, regulated, and maintained by means of known and suitable mechanical devices such, for example as the screw 29 shown in Figure IV for the purpose of regulating the exit clearance.

It will be understood in the foregoing discussion that the device shown in Figure IV is provided with suitable side walls to keep the liquid mass within the container and within the faces of the machine, although these are not shown in the drawings.

Although my invention has been described in connection with an application thereof to the separation of cook liquor from kraft and soda pulp, it is apparent and it will be understood that it may advantageously be applied as well to filtering operations generally wherein it is desired to separate a liquid from a mass of suspended solid or the like.

Furthermore, although I have shown and described specific applications and methods of utilization of my invention, and more particularly the placement of the suction box or boxes thereof, various changes may be made therein without departing from the invention or sacrificing any of the advantages thereof.

According to my invention, highly desirable advantages are obtained over previously proposed processes, such, for example, as the ability to utilize simultaneously suction and pressure and thus to continuously obtain a relatively complete and rapid removal of filtrate from solid or semi-solid material; the construction of the interior of the suction box is also novel and advantageous, inasmuch as it consists of a continuous series of slats resembling in appearance the well-known caterpillar type of construction; this construction consisting of a number of roller chains spaced at desirable intervals along the width of the suction box, the roller chains in turn being driven and revolving around sprockets at the ends of the suction box, and attached thereto are the slats or supporting mechanism for the synchronously moving wire screen. Between the ends of the suction box are provided suitable rails or tracks upon which the roller chains roll, these rails being suitably supported so that the surface of the box can stand a high degree of pressure. According to this invention it is not necessary to have a continuous width or multiplicity of chains across the width of the suction box because between each of the roller chains and supporting devices the slats act as rigid supporting members and hold the surface level at all times with no tendency to sag between the chains or supported sections. Due to this construction it is not necessary to have a great number of supporting rails and thus complicate the interior mechanism of the suction box, and, on the other hand, the design allows extremely rigid construction with great lightness and flexibility as well as simplicity of parts. Numerous other advantages of my invention will be apparent to those skilled in the art.

I claim:

1. In a continuous filtering device comprising a frame, a continuous moving screen, a suction box in contact with said screen and means for producing vacuum in said suction box, a plurality of slats within said suction box mounted upon links of a series of rotatable endless roller chains and supporting said screen, means for supporting the roller member of said links, means for maintaining said links and movable member thereof in fixed movable rolling relationship to said supporting means, and means for rotating said screen and said slats supported by said links at approximately the same speed.

2. In a continuous filtering device comprising a frame, a continuous moving screen, a suction box in contact with said screen and means for producing vacuum in said suction box, a plurality of slats within said suction box mounted upon links of a series of rotatable endless roller chains and supporting said screen, means for supporting the roller member of said links, means for maintaining said links and movable member thereof in fixed movable rolling relationship to said supporting means, means for maintaining said rotatable endless roller chains under constant tension, and means for rotating said screen and said slats supported by said links at approximately the same speed.

3. In a continuous filtering device comprising a frame, a continuous moving filtering member, a suction box in contact with said filtering member and means for producing vacuum in said suction box, a plurality of slats within said suction box mounted upon a series of endless roller chains and supporting said filtering member, means for supporting said roller chains, means for maintaining said roller chains and movable rolling member thereof in fixed movable relationship with said supporting means, and means for rotating said filtering member and said slats supported by said roller chain at approximately the same speed.

4. In a continuous filtering device comprising a frame, a continuous moving screen, a suction box in contact with said screen and means for producing vacuum in said suction box, a continuous series of supporting members extending across the width of said suction box and supporting said screen mounted upon links of a series of rotatable endless roller chains, means for supporting the roller members of said links, means for maintaining said links and movable rotating member thereof in fixed movable relationship with said roller member supporting means, and means for rota'ing said screen and said supporting members supported by said links at approximately the same speed.

5. A continuous filtering device which comprises an upper and lower unit, placed one above the other, each containing a continuous moving screen, a suction box over the lower part of said moving screen in said upper unit, and under the upper part of said moving screen in said lower unit and means for producing vacuum inside said suction boxes, a plurality of slats within each of said suction boxes mounted upon a series of endless roller chains and supporting said moving screens against pressure, means for supporting said roller chains, means for maintaining said roller chains and movable roller member thereof in fixed movable relationship with said means of support, means for rotating said moving screens and said slats supported by said roller chains at approximately the same speed and means for maintaining the working surfaces of said upper and lower units at an angle one to the other.

6. A continuous filtering device which comprises an upper and lower unit, placed one above the other, each containing a continuous moving screen, a suction box in contact with said moving screen and means for producing vacuum inside the lower suction box, a plurality of slats within said suction boxes mounted upon a series of endless roller chains and supporting said moving screens against pressure, means for supporting said roller chains, means for maintaining said roller chains and movable rolling member thereof in fixed movable relationship with said supporting means, means for rotating said moving screens and said slats supported by said roller chains at approximately the same speed, and means for maintaining against pressure said upper unit in fixed angular relationship to said lower unit.

7. In a continuous filter of the frame, continuous moving screen and suction box type, a plurality of slats within said suction box supporting said screen and mounted upon supported links of a series of rotatable, endless, roller chains.

ROGER W. RICHARDSON.